United States Patent
Le Coq et al.

(10) Patent No.: US 8,533,816 B2
(45) Date of Patent: Sep. 10, 2013

(54) METHOD OF SECURING A CHANGING SCENE, CORRESPONDING DEVICE, SIGNAL AND COMPUTER PROGRAM, METHOD OF UPDATING A CHANGING SCENE, CORRESPONDING DEVICE AND COMPUTER PROGRAM

(75) Inventors: Elouan Le Coq, Rennes (FR); Laurent Masson, Rennes (FR); Pierre Gouesbet, Longaulnay (FR); Jean-Claude Dufourd, Le Kremlin Bicetre (FR)

(73) Assignee: Streamezzo, Paris (FR)

( * ) Notice: Subject to any disclaimer, the term of this patent is extended or adjusted under 35 U.S.C. 154(b) by 259 days.

(21) Appl. No.: 12/989,650

(22) PCT Filed: Apr. 17, 2009

(86) PCT No.: PCT/EP2009/054629
§ 371 (c)(1),
(2), (4) Date: Jan. 5, 2011

(87) PCT Pub. No.: WO2009/130173
PCT Pub. Date: Oct. 29, 2009

(65) Prior Publication Data
US 2011/0093915 A1    Apr. 21, 2011

(30) Foreign Application Priority Data

Apr. 23, 2008    (FR) .................................... 08 52742

(51) Int. Cl.
*G06F 21/00*    (2013.01)
(52) U.S. Cl.
USPC ........ 726/19; 726/1; 726/17; 726/18; 726/20; 726/21; 726/22; 713/189; 713/190; 713/191; 713/192; 713/193; 713/194; 705/51; 705/52; 705/53; 705/54; 717/174; 717/175; 717/176; 717/177; 717/178

(58) Field of Classification Search
USPC ...................................................... 726/19, 1
See application file for complete search history.

(56) References Cited

U.S. PATENT DOCUMENTS

| | | | |
|---|---|---|---|
| 6,911,982 B1 * | 6/2005 | Signes | 345/473 |
| 6,963,972 B1 * | 11/2005 | Chang et al. | 713/153 |

(Continued)

FOREIGN PATENT DOCUMENTS

| | | | |
|---|---|---|---|
| WO | WO 9939272 A1 * | 8/1999 | |
| WO | 0169350 A1 | 9/2001 | |
| WO | WO 0169350 A1 * | 9/2001 | |

OTHER PUBLICATIONS

International Search Report from International Application No. PCT/EP2009/054629 dated Aug. 13, 2009.
Dufourd, J C. et al., An MPEG Standard for Rich Media Services, IEEE, Oct.-Dec. 2005, pp. 60-68 (9 pages).

(Continued)

*Primary Examiner* — Andy Rao
*Assistant Examiner* — Shan Elahi
(74) *Attorney, Agent, or Firm* — Zilka-Kotab, PC

(57) ABSTRACT

The invention relates to a method of securing a changing scene composed of at least one element and intended to be played back on a terminal. According to the invention, such a method comprises the following steps: creation (10) of at least one security rule, defining at least one authorization to modify said scene and/or at least one element of said scene and/or an authorization to execute at least one command in a context of playing back said scene on said terminal; allocation (10) of a security policy, comprising at least one of said security rules, to said scene and/or to at least one of said elements of said scene.

11 Claims, 3 Drawing Sheets

(56) References Cited

U.S. PATENT DOCUMENTS

| | | |
|---|---|---|
| 7,746,882 B2 | 6/2010 | Vedantham et al. |
| 2004/0202382 A1* | 10/2004 | Pilu .............................. 382/276 |
| 2005/0086354 A1* | 4/2005 | Orchard ........................ 709/231 |
| 2007/0180496 A1* | 8/2007 | Fransdonk ........................ 726/3 |
| 2008/0049789 A1 | 2/2008 | Vedantham et al. |
| 2008/0134167 A1 | 6/2008 | Chae et al. |
| 2011/0055384 A1* | 3/2011 | Audinet et al. ............... 709/224 |

OTHER PUBLICATIONS

Iannella, R., Rights Languages for IPMP using ODRL, International Organisation for Standardisation, IPR Systems Pty. Ltd., Oct. 13, 2000, pp. 1-28.

Office Action from Chinese Patent Application No. 200980114102.3, dated Nov. 29, 2012.

Written Opinion from International Application No. PCT/EP2009/054629, dated Aug. 13, 2009.

* cited by examiner

METHOD OF SECURING A CHANGING SCENE, CORRESPONDING DEVICE, SIGNAL AND COMPUTER PROGRAM, METHOD OF UPDATING A CHANGING SCENE, CORRESPONDING DEVICE AND COMPUTER PROGRAM

CLAIM FOR PRIORITY

The present application is a Section 371 National Stage Application of International Application No. PCT/EP2009/054629, filed Apr. 17, 2009, which claims the priority of French Patent Application No. 0852742, filed Apr. 23, 2008, the entire contents of which are incorporated herein by reference.

FIELD OF THE INVENTION

The field of the invention is that of rendering changing scenes on a terminal.

Such a terminal, for example, is a desktop computer, a portable computer, a radiotelephone type terminal, a PDA ("Personal Digital Assistant"), etc.

More precisely, the invention relates to securing such scenes, in particular when they are liable to be modified by a plurality of sources.

The invention applies in particular, but not non-limitatively, to multimedia content.

In particular, multimedia content is understood to be a set consisting of at least one animated graphic scene, or at the very least capable of changing over time, which is also called a multimedia scene or changing scene, and a series of commands enabling this scene to be changed.

A changing scene corresponds, in particular, to the arrangement of a set of graphic objects in time and space, with which the user of the terminal can interact.

The invention applies, in particular, to already known graphic scene description formats such as MPEG-4/LASeR ("Lightweight Application Scene Representation"), MPEG-4/BIFS ("Binary Format Scene"), SVG ("Scalable Vector Graphics"), SMIL ("Synchronized Multimedia Integration Language"), XHTML ("Extensible HyperText Markup Language"), etc.

PRIOR ART

A changing scene can be represented in the form of a scene tree, the nodes of which correspond to the scene elements.

An exemplary graphic scene updating system is described in French Patent FR 2765983, filed by France TELECOM and TDF.

Most of the time, a single source is capable of modifying such a scene, and of thus modifying the corresponding scene tree.

However, in particular in the case of mobile services, a scene tree can be progressively constructed by applying successive incremental scenes to the original scene, an incremental scene being a set of modifications of an existing scene. In this case, several sources can generate instructions for modifying a scene tree.

"Rich Media"® formats having update commands and enabling such incremental scene definition are currently: "MPEG-4 BIFS", "MPEG-4 LASeR", "DIMS" ("Dynamic and Interactive Multimedia Scenes") of the organization "3$^{rd}$ Generation Partnership Project", and "RME" ("Rich-Media Environment") of the organization "Open Mobile Alliance".

In the case where several sources are capable of modifying a scene tree, the question arises as to the confidence to be granted to these multiple sources to provide a scene resulting from the aggregation of the contributions of the various sources.

As a matter of fact, there are a plurality of types of modifications or updates possible for one scene, for example:

a server sends update commands to be executed at a given moment;

update commands were sent by a server, stored in the scene rendering terminal and then the execution of same is initiated by an action of the terminal's user;

a server sends data which, after processing in the rendering terminal, results in the application of update commands;

a program run on the rendering terminal applies update commands.

In the majority of cases, the update originates with a server, even if it can be initiated by an action of the terminal, or constructed by a program on the terminal (but from data derived from a server).

It is important to secure these updates, and accesses to the corresponding scene tree, when the latter are not implemented by the entity responsible for designing the service, but by a plurality of sources.

In the "SVG" format, a solution was developed for getting around this problem of securing a changing scene, with the use of an element noted as "animation". This element enables a second scene to be loaded, controlled by the originator scene and not allowing the second scene to interact with the first scene.

One disadvantage of this technique of the prior art is that it does not solve the problem of securing a changing scene capable of being modified by several sources, but avoids it by creating a second scene incapable of acting on the first one.

The "MPEG-4 BIFS" format likewise proposes a solution enabling the securement problems to be avoided, with the implementation of an element noted as "Inline".

The concept of a "SecurityManager" likewise exists in the field of Java applets. This concept encompasses a set of limitations on the actions that a program can invoke.

One disadvantage of this solution of the prior art lies in the static aspect of the "SecurityManager", which is essentially a java class, and therefore cannot make it possible, for example, to specify at which locations an action can be authorized, or at the request of whom an action can be authorized.

OBJECTIVES OF THE INVENTION

The invention has the objective, in particular, of mitigating these disadvantages of the prior art.

More precisely, one objective of the invention, according to at least one embodiment, is to enable the securement of a changing scene capable of being modified by a plurality of sources.

In particular, the objective of the invention is to provide such a technique having improved performance in terms of the integrity of a changing scene and in terms of the multiplicity of possible secured modifications of a changing scene.

Another objective of the invention, according to at least one embodiment, is to provide such a technique ensuring compatibility with the existing changing scenes and the existing scene rendering terminals.

Another objective of the invention is to provide such a technique to be as flexible as possible in terms of definition of the securement data and secured areas in a changing scene.

DISCLOSURE OF THE INVENTION

The invention proposes a novel solution which does not have all of these disadvantages of the prior art, in the form of a method for securing a changing scene consisting of at least one element and intended to be rendered on a terminal.

According to the invention, such a method includes the following steps:

creation of at least one securement rule, defining at least one authorization for modifying said scene and/or at least one element of said scene and/or one authorization for executing at least one command in a context of rendering said scene on said terminal;

assignment of a security policy, including at least one of said securement rules, to said scene and/or to at least one of said elements of said scene.

In this way, the invention is based on a novel and inventive approach for securing a changing scene, by assigning a security policy to one or more elements of the scene or to the entire scene, which defines the modification authorizations associated with this or these elements or with the entire scene, as well as the authorizations to execute one or more commands in the context of rendering the scene on the terminal.

This security policy is defined by securement rules, each corresponding to at least one modification or command execution authorization.

For example, a securement rule can specify that a type of action (insertion, replacement, erasure, execution of a command, modification of a securement rule . . . ) is authorized on the element, or, on the other hand, that no action is authorized on the element, or that only modification actions are authorized.

Thus, the invention enables the changes in a scene to be secured, by assigning to some, or to all of the elements of the scene, authorizations for modifying or for executing a command, which then enables, for example, during receipt of an update of the scene, to validate or not validate the update, based on the authorizations previously assigned to the elements of the scene.

According to one embodiment of the invention, the security policy is defined in a separate file or flow separate from a description file or flow of said changing scene.

Thus, the method according to the invention enables security policies to be defined, which are associated with a scene or an element of a scene, without modifying the scene description file or flow. For example, an already created scene, or even already rendered and in use, can benefit from securement according to the invention.

In this way, the securement method according to this embodiment of the invention ensures compatibility with already created scenes.

In addition, the method according to this embodiment of the invention likewise enables compatibility to be ensured with the existing document renderers, which would not be capable of using the security policies and of implementing scene securement. As a matter of fact, since the scene description files are not modified, a document renderer not adapted for managing security policies can process the changing scene and the rendering thereof as a "conventional" scene not benefiting from any security policy.

According to another embodiment of the invention, the security policy is defined in a description file or flow of said changing scene.

In this way, the method according to this embodiment of the invention enables security policies to be defined which are associated with a scene or an element of a scene, directly in the scene description file or flow, so as to facilitate the processing of these security policies. As a matter of fact, the securement rules are directly accessible upon reading and processing the scene description tree. In addition, this alternative enables updates of the securement data using the same mechanisms as those used for the scene elements.

According to one particular aspect of the invention, the securement method includes the following steps:

obtainment of at least one item of identification information for at least one source capable of modifying said scene and/or of modifying a rendering context for said scene;

association, in said security policy, of said at least one item of identification information with at least one securement rule of said security policy.

In this way, the method according to this embodiment of the invention enables rights to be assigned, which correspond to the authorizations assigned to the elements of the scene, to one or more sources capable of being at the origin of updates of the scene, or of executing commands in a rendering context of the scene.

An update source can be a server, for example, a server transmitting updates of the scene.

A source can likewise correspond to a communication channel, capable of having, as data "providers", a server or a plurality of servers. For example, a source can correspond to an "http" type connection established in the context of rendering the changing scene, between the rendering terminal for the scene and a remote server serving as a switching node or switcher, for data coming from a plurality of other servers. In this way, the method according to the invention enables rights to be defined, which are associated with a predefined connection, or with a communication channel, and not with the data providers using the connection or the channel.

For example, an update source can have the right to modify a type of scene element, irrespective of the modification, or else can have the right to carry out a predefined type of action on all of the scene elements.

In this way, the security policy assigned to one or more elements of a scene can be applied, for example during a requested update for the scene, in conjunction with verification of the rights of the source issuing the update.

In this way, securement of the changes in the scene is enhanced and diversified.

A security policy can therefore be represented in the form of a list of pairs (identification information, securement rule).

In particular, the elements of a changing scene are organised in a tree structure associating at least one parent element with at least one child element, and a security policy assigned to said parent element likewise applies by default to said at least one child element.

Thus, by default, an element not having its own security policy benefits from the security policy assigned to its parent element. This makes it possible to not have any unsecured elements in a scene.

According to a particular aspect of the invention, the securement method includes a step of defining at least one group consisting of elements of said scene sharing a single security policy.

In this way, it is possible to assign a security policy to one (or more) sets or groups of elements of the scene. In this way, a security policy can be assigned to various levels of precision in a scene: an element, a group of elements or the entire scene.

According to one particular characteristic of the invention, said modifications belong to the group including at least:

insertion of an element into said scene;
modification of an element in said scene;
deletion of an element from said scene;
modification of an attribute in said scene;
deletion of an attribute from said scene;
modification of a security policy in said scene.

In particular, this thus enables the modifications impacting the elements of a scene, or the attributes of a scene to be secured, as well as the modifications impacting the security policy assigned to an element, a group of elements or an entire scene.

For example, said securement rules include at least one item of information belonging to the group including at least:
- a restriction of applying a modification to one element of said scene;
- a restriction of applying a modification to a group of elements of said scene;
- a restriction of applying a modification to all of the elements of said scene of a predefined type;
- a restriction of applying a modification to a type of attributes of said scene;
- a restriction of applying a modification based on at least one predetermined criterion;
- a restriction of executing a command or a group of commands in a given context of said scene.

Thus, the securement rules can, in particular, specify the type of modification or authorized action, the location of the scene where the action is authorized (an element, a group of elements, a type of element . . . ), the type of attributes on which the action is authorized.

For example, the securement rules can be defined as follows:
- the right to remain permanently active for an application;
- the right to display an icon/dynamic information/. . . within the graphic interface of the terminal;
- the right to listen to a keyboard key in order to change from active/inactive mode;
- the right to add an element to a menu in order to change from active/inactive mode;
- the right to take control of the screen in the event of inactivity;
- the right to add a message superimposed over the application;
- the right to add user interface elements;
- the right to modify an element based on the status thereof (active/inactive);
- the right to add an element if other elements of the same type do not already exist in the scene;
. . .

According to one particular aspect of the invention, said identification information belongs to the group including at least:
- an identifier;
- an IP address;
- a certificate used to sign content transmitted by said source.

In this way, it is possible to implement various levels of identification of a source, based on the desired level of security. A simple identifier or an IP address do not ensure a very high level of security, because they can be modified by the source in order to correspond to an authorized source. On the other hand, the use of a certificate enables a certain level of security to be guaranteed by more reliably identifying a source desiring to modify the scene.

The invention likewise relates to a method of updating a changing scene created by the securement method described above, said scene consisting of at least one element and intended to be rendered on a terminal.

According to the invention, such a method includes the following steps:
- receipt of an update request, originating with a source and/or a data transmission channel, for an element of said changing scene, a group of elements of said changing scene, or said entire changing scene and/or a request to execute a command in a context of rendering said changing scene;
- acceptance or refusal of said update request and/or request to execute a command, based on a security policy assigned to said element, or to said group or said scene.

According to one particular characteristic of the invention, the update method includes a step of identifying said source, issuing an item of identification information, and the acceptance step takes account of a security policy associated with said item of identification information.

It is thus possible to verify the validity of an update received for a scene, by taking account of the predefined security policies with regard to the scene being updated, and of the identification of the source at the origin of the update.

For example, if the server that has transmitted the update is not identified in the lists of pairs (identification information, securement rule) of the security policies defined with regard to the scene, then the update is refused.

If the server is known, then the method implements additional steps in order to validate or not validate the update.

According to one particular characteristic of the invention, said item of identification information is provided by a means of access to said update and/or said command.

This approach thus enables use of the means of access to the update (reading a file, opening a connection . . . ) in order to identify the source and the rights associated therewith. For example, if an update is transmitted via an http connection, the means of access provides the source identification directly.

According to another particular characteristic of the invention, said item of identification information is present in said update and/or said command.

In this way, if the means of access to the update do not provide any identification information about the source at the origin of the update, e.g., in the case of opening and reading a file, the method according to the invention searches for the identification information in the update itself, e.g., in the form of a signature or code.

In particular, said acceptance or refusal step includes the following sub-steps:
- decoding of said update and/or said command;
- identification of a security policy associated with said element or with said group of elements or with said scene concerned by said update;
- verification of the presence of an association of said item of identification and of at least one securement rule corresponding to said decoded update and/or said command, in said security policy identified, thereby issuing a decision to accept said update and/or said command if said verification is positive.

It is thus possible to be assured that the update requested by the server identified is actually authorized.

In a first phase, the method decodes the update so as to determine, in particular, to which portion of the scene it applies (the entire scene, a group of elements, an element . . . ), and what type of update is involved (modification, execution of a command . . . ).

Next, from this information, and, in particular, from the information indicating to which portion of the scene the update applies, the method identifies the security policy associated with the portion of the scene in question.

Finally, the method verifies that the type of update is indeed authorized with regard to the identified portion of the scene, by the source identified by the original information.

If such is the case, the update is validated, if not, it is refused.

The invention likewise relates to a signal representative of a changing scene consisting of at least one element and intended to be rendered on a terminal, including at least one securement field including at least one item of information representative of a security policy, including at least one securement rule defining at least one authorization to modify said element and/or said scene, so as to enable or prohibit, in a terminal, a modification requested by a source, based on said policy.

The invention further relates to a device for securing a changing scene consisting of at least one element and intended to be rendered on a terminal.

According to the invention, such said device includes:

means of creating at least one securement rule, defining at least one authorization to modify said scene and/or at least one element of said scene and/or an authorization to execute at least one command in a context of rendering said scene on said terminal;

means of assigning a security policy, including at least one of said securement rules, to said scene and/or to at least one of said elements of said scene.

Such a securement device is in particular capable of implementing the steps of the securement method as described above.

Such a device, for example, is a computer or a server used for creating changing scenes.

The invention also relates to a device for updating a changing scene, said scene consisting of at least one element and intended to be rendered on a terminal.

According to the invention, such a device includes:

means of receiving an update request, originating with a source and/or a data transmission channel, for an element of said changing scene, a group of elements of said changing scene, or said entire changing scene and/or a request to execute a command in a context of rendering said changing scene;

means of accepting or refusing said update request and/or request to execute a command, based on a security policy assigned to said element, or to said group or said scene.

Such an update device is, in particular, capable of implementing the steps of the update method as described above.

Such a device, for example, is a terminal for rendering changing scenes.

The invention further relates to a computer program downloadable from a communication network and/or recorded on a computer-readable medium and/or executable by a processor, including program code instructions for implementing the securement method as described above, when said program is run on a computer.

Finally, the invention likewise relates to a computer program downloadable from a communication network and/or recorded on a computer-readable medium and/or executable by a processor, including program code instructions for implementing the update method as described above, when said program is run on a computer.

LIST OF THE FIGURES

Other characteristics and advantages of the invention will become more clearly apparent upon reading the following description of a particular embodiment, given for purely illustrative and non-limiting purposes, and from the appended drawings, in which.

DESCRIPTION OF AN EMBODIMENT OF THE INVENTION

The general principle of the invention is based on the assignment of a security policy to a changing scene, or to one or more of the elements thereof, thereby enabling modification authorizations to be specified for the scene, or for one of the elements thereof, based on the source or sources capable of modifying the scene.

The approach of the invention thus enables the changes in a scene to be secured, in particular when the latter is updated by one or more sources.

The securement of a scene can occur according to the following terms:

certain sources have the right to modify the scene and others do not have the right;

certain areas of the scene can be modified and others cannot;

certain operations are authorized on certain elements of the scene and others are not;

. . .

These examples correspond to authorizations defined for a scene, or a set of scenes. These authorizations can likewise be combined for a more refined and accurate securement.

For example, a source can be authorized to apply a type of modification to a group of elements of a scene.

These principles are described in greater detail below, in connection with the various figures showing embodiments of the invention.

Figure 1:
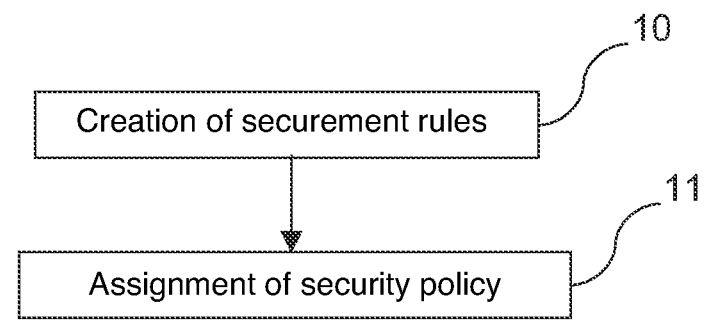
FIG. 1 shows the principal steps of the securement method according to a particular embodiment of the invention.
Figure 2:
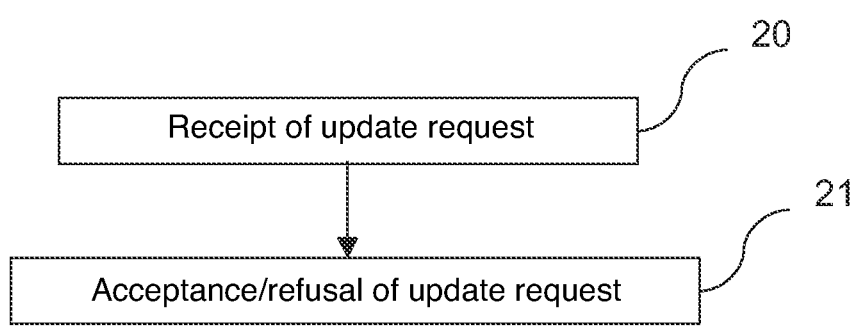
FIG. 2 shows the principal steps of the update method for a scene created according to the method shown in FIG. 1.

The principal steps of the securement method according to one embodiment of the invention will now be presented in connection with FIG. 1.

A changing scene to be secured is taken into account, which includes a plurality of elements, some of which are capable of being consolidated into groups.

It is desired to secure this scene while same is being rendered on a terminal, so as to not enable unauthorized updates, or unauthorized actions in the context of rendering the scene on the terminal, and to thereby ensure the integrity of the scene during the rendering and changes thereof.

During a first step 10, one or more securement rules are created in connection with the scene.

These securement rules enable one or more modification authorizations to be defined, which are then applicable to the scene, or to an element of the scene or else to a group of elements of the scene.

These securement rules likewise enable one or more authorizations to execute commands to be defined in a context of rendering the scene on the terminal. For example, certain updates do not modify the scene but only the rendering context of the scene, by adding an icon to the graphic interface of the terminal, for example, or by modifying the processing of certain keys of the keyboard of the terminal for rendering the scene.

Once these securement rules have been defined, a second step 11 of the method consists in assigning them to the elements of the scene (element by element, or by group of elements, or for the entire scene), in the form of a security policy.

In this way, each element of the scene is associated with a security policy, guaranteeing it control over the updates that it may undergo.

A security policy can include one or more security rules, depending on the security level of the element to which the policy is assigned.

For example, a general security policy can be assigned to the scene, thereby authorizing the scene creation server for all possible updates, as well as all possible command executions. In this way, the server creating the original scene has all of the rights to the scene and to all of the elements thereof.

Next, a security policy can be assigned separately to each element of the scene, in order to specify the actions authorized on each element, as well as the sources authorized to carry out these actions.

According to various alternative embodiments, the security policies can be defined directly in the description file of the changing scene, or in a separate file (these two alternatives are described in greater detail below in connection with FIGS. 4a and 4b).

Additional steps of the securement method according to the invention are described in greater detail in connection with FIG. 3, and, in particular, step 30, which enables definition of identification information for the plurality of sources capable of modifying the changing scene during the rendering thereof.

The principal steps of the method of updating a changing scene will now be described, which include, in particular, one or more security policies assigned to one or more elements of the scene, as described above.

It is considered that the changing scene is being rendered on a terminal, and that a source desires to update same.

The first step 20 consists in receiving an update request for the scene, or an element or group of elements of the scene, or a request to execute a command in the context of rendering the scene.

For example, this request is issued by a server which wishes to add an element to the scene, at a precise location, which corresponds to adding a child to an element already present in the scene tree.

Or else, this request is issued by a server which desires to install an application within the context of rendering the scene and, in particular, to add the icon for this application to the list of available applications on the terminal.

Once the request has been received, it is accepted or refused, during step 21, based on one or more security policies assigned to the scene, or to an element or group of elements of the scene, based on the update target.

In this way, before accepting the update, or the request to execute a command, it is verified whether this update is authorized, i.e., whether the sending source is authorized to modify the scene and whether the target of the update (the element or the group of elements or the entire scene) authorizes the update in question.

This acceptance or refusal step includes several sub-steps, which are described in greater detail in connection with FIG. 3, and which, in particular, enable the source to be identified and to verify whether same belongs to the sources authorized to act on the scene or the rendering context of the scene.

Figure 3:
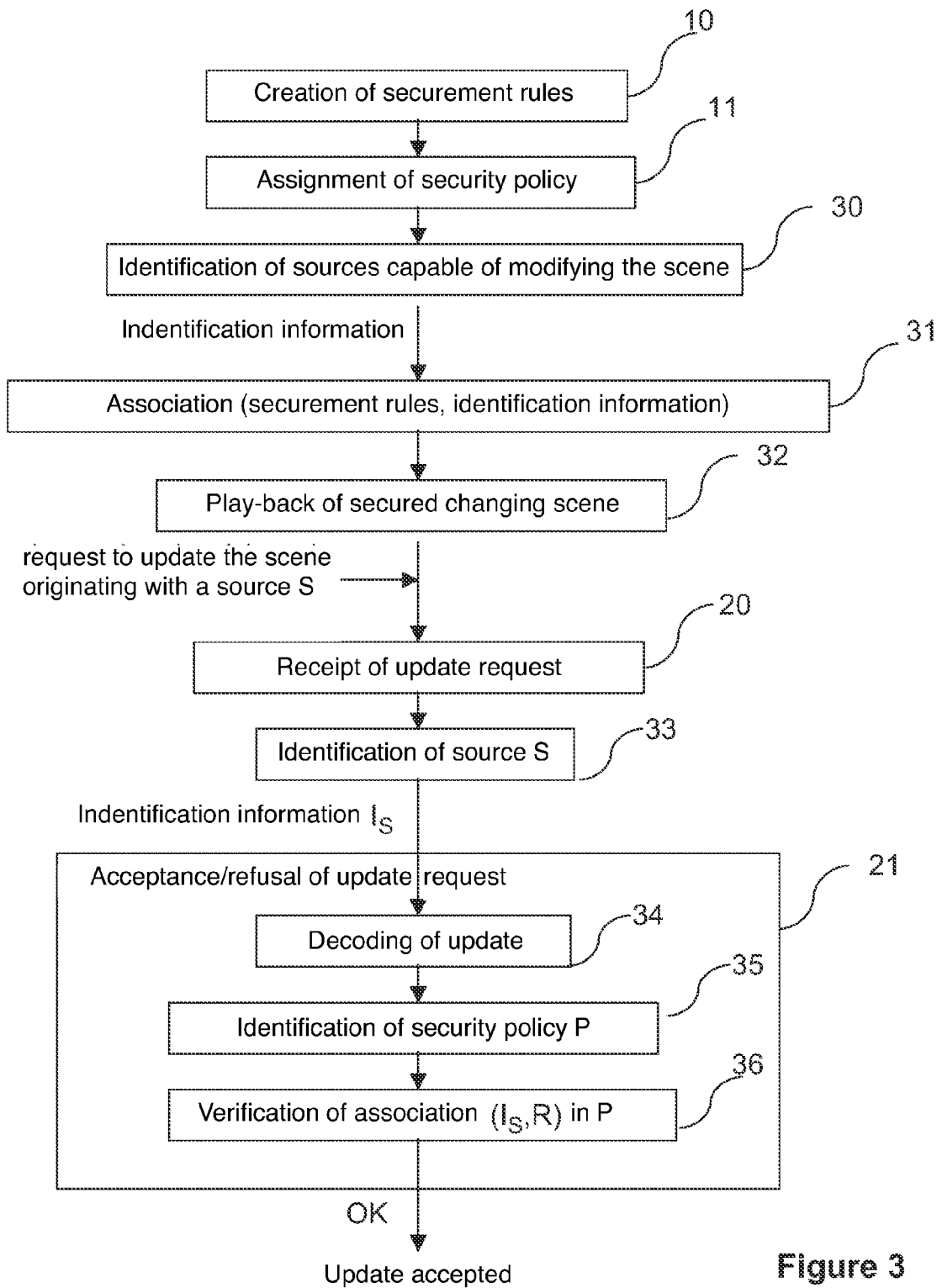
FIG. 3 shows the principal steps of the securement and update methods according to a particular embodiment of the invention.

The principal steps of the method for securing a changing scene and of the method for updating such a scene will now be presented in connection with FIG. 3, according to one embodiment of the invention.

As previously, a changing scene to be secured is taken into account, which includes a plurality of elements, some of which are capable of being consolidated into groups of elements.

The first two steps 10 and 11 of the securement method are the same as those described above in connection with FIG. 1.

The next step 30 consists in identifying a plurality of sources capable of modifying the changing scene in question.

Among these sources, for example, one or more servers can be identified by an IP address, or a certificate used to sign content transmitted by the server.

A communication channel or a connection can likewise be identified, which is used by a plurality of sources to transmit updates of the changing scene.

This step 30 issues one or more items of identification information, which, during step 31, are then associated with one or more securement rules, in the security policies assigned to the elements or groups of elements of the scene.

A security policy thus corresponds to a list of pairs (securement rules, identification information).

For example, a security policy assigned to an element can specify that only two identified sources S1 and S2 are authorized to modify this element, but unauthorized to destroy it.

Or else, a security element assigned to an element can specify that a source S1 is authorized to modify and destroy the element, that a source S2 is authorized to modify the element under certain conditions (e.g., only if the element has no children), but not to destroy same, and that a source S3 has not right to modify the element.

The changing scene thus secured is then rendered on the terminal, during step 32.

During this rendering, the changing scene is updated by a plurality of sources, following actions by the user of the terminal, or at the initiative of the sources themselves, e.g., servers.

In this embodiment, it is considered that a source S requests the changing scene to be updated.

During step 20, which was already described above, the update request is received by the rendering terminal.

The following step 33 consists in identifying the source S at the origin of the update, so as to verify, in a first phase, that this source S is authorized to update the scene.

This step of identifying the source S issues an item of identification information $I_S$.

This identification information can be obtained in various ways, based, in particular, on the type of access, or the means of access to the update.

As a matter of fact, when the terminal receives an update, it is informed of the means of access to this update. For example, the update can be accessible by reading a file, or by opening a connection, e.g., of the "http" type, or by access to a particular local address on the terminal.

For some of these various means of access, the identification of the source is provided directly: for example, in the case of opening an "http" connection, the "http" connection address is specified, thereby identifying the source.

However, for example, in the case where the means of access to the update corresponds to the reading of a file, the identification information is not available directly and must be recovered from the file itself. In this case, the identification information is present in the contents of the update, e.g., in the form of a code or signature.

Once this identification information $I_S$ has been obtained, the acceptance or refusal step 21 is implemented.

This step includes, in particular, the principal sub-steps 34, 35 and 36.

Preliminarily, if the identification information $I_S$ is not present in any of the security policies assigned to the scene (the policies assigned to the entire scene, and the policies assigned to elements or groups of elements of the scene), the update is refused immediately, because the source is not authorized to update the scene, irrespective of the update and the target of this update.

If the information $I_S$ is present in at least one of the security policies assigned to the scene, then the following sub-steps are implemented.

Sub-step 34 consists in decoding the update, in particular in order to determine to which portion of the scene it applies: the entire scene, a group of elements, an element . . . .

This decoding step likewise makes it possible to know the action or actions implemented for executing the update (insertion of an element, deletion of an element, etc.).

In this example, it is considered that the update applies to a group of elements G, and that it consists in adding a child to each of the elements of the group G.

From this decoding of the update, the security policy P associated with this group of elements G is identified, during step 35, either by reading the description file for the scene ($1^{st}$ alternative described above), or by reading the separate file used to define the security policies for the scene ($2^{nd}$ alternative described above).

The following step 36 verifies whether the identification information $I_S$ is associated with a securement rule in the security policy P for the group of elements G to which the update applies.

For example, if the security policy for the group G specifies, among other things, that the source S (identified by $I_S$) is authorized to modify the group, but not to delete it, then the update is accepted. On the other hand, if the security policy for the group G specifies that the source S is not authorized to modify the group, but only an element of the group, for example, then the update is refused.

Figure 4A:
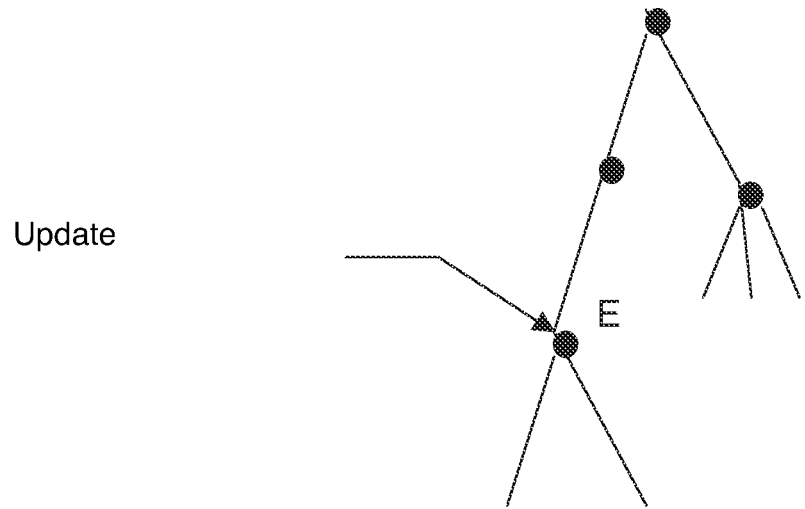
FIGS. 4a and 4b show an exemplary modification of a scene tree according to the prior art and according to a particular embodiment of the invention.
Figure 4B:
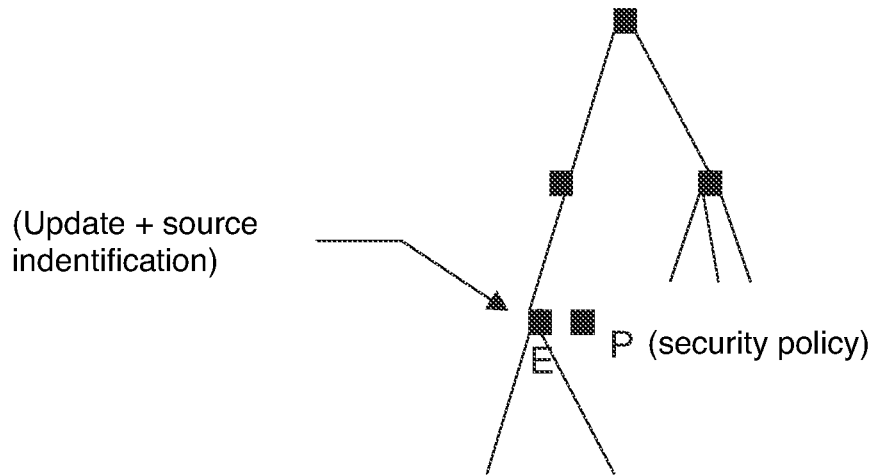

A scene tree will now be presented in connection with FIGS. 4a and 4b, to which an update is applied, according to the prior art and according to an embodiment of the invention, respectively.

According to the prior art, an update is applied to the unsecured element E, i.e., without any verification of the origin of the update source, and without applying any rules for authorizing modifications in the scene.

Irrespective of the type of update and the target of the update, the latter is implemented, with the risk that the source at the origin of the update is not a recognized source and that the update will degrade the scene.

According to an embodiment of the invention, the same update is associated with identification information about the source and the element E, for which the update is intended, is associated with a security policy, as defined above, thereby making it possible to verify whether the update originating with the identified source is authorized with regard to the element E.

According to a first alternative of this embodiment, the security policy associated with element E is described in the description file for the scene. It is therefore possible to represent the data corresponding to this security policy in the scene tree associated with the scene.

In addition, this security policy data can be processed in the same way as the other data corresponding to the elements of the scene tree, and can therefore, for example, be the subject of updating according to the same update mechanisms as the other elements of the scene.

The security policy data is thus directly accessible for processing upon reading the scene tree.

According to a second alternative (not shown in FIG. 4b), the security policy associated with element E is described in a file separate from the description file for the scene.

Thus, the format of a scene description file is the same whether or not a securement policy is assigned to the scene.

For example, in the case of a pre-existing scene, it is not necessary to modify the description file for the scene in order to implement the securement method according to this alternative of the invention.

This therefore makes it possible to ensure compatibility with the scenes already created, to which one wishes to apply the securement method according to the invention.

This likewise makes it possible to ensure compatibility with scene rendering terminals which would not have the capability of implementing the securement method of the invention. Since the scene tree has not been modified, such a terminal can always render the scene, without implementing the securement.

Description of a First Exemplary Embodiment

A first exemplary implementation of the invention will now be presented in the framework of securing the graphic interface of a terminal.

The document renderer of the terminal, in this case, of the "Rich Media"® type, is responsible for the entire interface of the terminal.

The desktop, the icons, the menus and all of the interface elements are elements described in the "Rich Media"® format, understood by the document renderer.

All of the descriptions of interface elements contribute to a single unique changing scene which displays the desktop or the basic page of the terminal.

It is assumed that the manufacturer of the terminal is the entity which possesses all of the original rights, and that this manufacturer then grants limited rights, according to the securement method of the invention, to certain partner companies which provide applications for the terminal.

Amongst the interface elements, some are created by the manufacturer of the terminal, and others are provided by the partner companies.

A minimal right is granted to each application, which consists in being capable of:
  acting on the interface in order to create an access icon for the application;
  overriding the document renderer in order to control the screen content when the icon is activated;
  return control of the screen to the document renderer when the user quits the application.

In addition, for an application, the securement method according to the invention enables rights to be defined more precisely, e.g., such as:
  the right to remain permanently active, and to display, within the graphic interface of the terminal, a status icon, or dynamic information such as a stock exchange information banner;
  the right to listen to the keyboard on a particular key in order to change from active/inactive mode;
  the right to add an element to the menu in order to change from active/inactive mode;
  the right to take control of the screen in the event of inactivity (screen saver);
  . . .

These rights correspond to securement rules for the graphic interface of the terminal.

Next, application providers are identified as being capable of providing applications for the terminal and therefore capable of modifying the graphic interface of the terminal.

These securement rules associated with the identified providers comprise the various security policies associated with the graphic interface of the terminal.

Next, during use of the terminal, and rendering of the scene corresponding to the graphic interface of the terminal, the update method according to the invention makes it possible to detect the unauthorized applications and the authorized applications, thereby ensuring the integrity of the graphic interface of the terminal.

Description of a Second Exemplary Embodiment

This example deals with the consumption of television programs on mobile terminals.

By default, consideration is given to a basic scene with a full-screen video and an audio object. Various interface elements make it possible to carry out current operations, such as changing the channel or increasing the audio volume.

Within the TV application, the user can likewise request access to the program guide, which consists of an addition, to the scene, of graphic objects and text describing the program for the following hours, with an interactivity enabling one to move about in the guide and to display other portions of the guide.

The scene thus modified is then much more complex than the basic scene, and changes upon each user action.

It is assumed that the provider of the mobile TV application is also responsible for the program guide, and therefore all of the aforesaid elements are provided by the same source, which possesses the scene. The question of securing the scene is then not essential, the only source of modifications being identified and authorized as the provider of the application.

However, when rendering the scene, other types of events can occur other than consultation of the program guide, e.g., such as interaction related to a program channel, e.g., a vote.

In this case, a message must appear as superimposed over the program, and then interface elements for voting (such as buttons), and then, where appropriate, a message confirming the vote cast.

Next, all of the elements added for the vote must disappear.

These modifications are derived from a source other than the mobile TV application provider and must therefore be secured.

To accomplish this, and to enable this interaction, the securement method according to the invention defines the following authorizations:
  authorization for the source of the interactions related to the program channel to add elements to a given group of elements A (in order to create the voting interface elements, i.e., the buttons and messages);
  authorization for the source of the interactions related to the program channel to perform any action on the elements present in A (in order to delete the voting interface elements in the end);
  authorization to capture and process a sub-set of keyboard/touch screen events (in order to take account of the user's vote);
  prohibition of any other operation which would modify the operation of the mobile TV application beyond the limits of voting.

Once these securement rules have been defined, the securement method associates same with identifiers of authorized sources, corresponding to the sources providing the data to the program channels, so as to define security policies for the scene.

Next, at the moment when the user interacts with the scene being rendered, the update method according to the invention applies these security policies in order to authorize or not authorize actions on the scene, based on the sources (TV channels) and predefined authorizations.

Another type of event can occur in the framework of a mobile TV application: priority events, e.g., such as an "abduction alert", i.e., an alert coming from authorities, and which must replace what is displayed and then allow the broadcast to resume without modification.

The rights to be defined are substantially equivalent to those defined previously in the case of voting, except that the grouping element A must mandatorily be visible and arranged such that the sub-elements thereof are displayed ahead of the entire remainder of the scene.

Description of a Third Exemplary Embodiment

Consideration is given to a changing scene comprising two groups:
  group 1 is a group intended to receive elements sent by the principal server of the scene (server P), and does not have any associated security policy (this means that only the original server P of the target update element has the right to modify the element);
  group 2 is intended to receive elements coming from a particular outside source (server E) and a security policy is assigned to same, which is defined by the securement method according to the invention, thereby authorizing all actions coming from server E;
  group 3 is intended to receive elements coming from an particular outside source (server X) and a security policy is assigned to same, which is defined by the securement method according to the invention, thereby authorizing all actions coming from server X.

During rendering of the scene, the latter receives a first command for inserting elements into group 1.

In a first phase, the update method according to the invention determines that the origin of the command is server S. It verifies that this server S forms part of at least one of the security policies associated with the scene.

By decoding the command, the method next determines that the target of the insertion is group 1 (having no security policy).

The update method therefore decides that the command is lawful, according to the security constraints, and executes same.

The scene next receives a second command for insertion into group 1 from a server X other than server S.

After having determined that the origin of the command is a server X, and that this server forms part of one of the security policies of the scene, the update method according to the invention determines that this server is not authorized to act in any way whatsoever on group 1, the target of the command.

This command is not lawful and is therefore ignored.

The scene receives a third command for insertion into group 2, coming from server E.

The update method according to the invention determines that the origin of the command is server E, e.g., by using a command signature mechanism which enables the origin thereof to be verified and the absence of modifications during transport.

The method verifies that this server E forms part of at least one of the security policies of the scene, and then decodes the command in order to determine that the target of the insertion is group 2 (which has a security policy that authorizes the commands coming from server E).

The command is therefore lawful and is executed.

The scene receives a fourth command for insertion into group 2, coming from a server Y.

The update method according to the invention determines that the origin of the command is server Y.

The method ascertains that this server Y does not form part of any security policy of the scene and therefore ignores the command, without even decoding same.

The invention claimed is:

1. A method comprising:
a processor creating at least one securement rule defining at least one authorization for modifying a user interface element of a scene;
the processor defining in a file a security policy that includes the created at least one securement rule in the security policy; and
the processor assigning the security policy including the at least one securement rule to the user interface element of the scene, wherein the security policy comprises a list of pairs including each of the at least one securement rule paired with different portions of identification information, the identification information defining a plurality of sources capable of updating the scene during a rendering of the scene;
wherein the security policy is operable for use in determining whether to allow or prohibit an update of the user interface element requested by a source by determining whether the source is included in the security policy, such that:
when it is determined that the source of the update request is not included in any of the different portions of the identification information in the security policy then the update is prohibited, such that the update is prohibited based only on the determination that the source of the update request is not included in any of the different portions of the identification information in the security policy, and
when it is determined that the source of the update request is included in at least one of the different portions of the identification information in the security policy, then the update is allowed when:
it is verified that one of the portions of the identification information in which the source of the update request is included is paired with a securement rule which authorizes a modification action to be used for implementing the update.

2. The method of claim 1, wherein the security policy is defined in a file or flow separate from a description file or flow of the scene.

3. The method of claim 1, wherein the security policy is defined in a description file or flow of the scene.

4. The method of claim 1, wherein the user interface element is organized in a tree structure associating parent element with at least one child element, and another security policy assigned to the parent element likewise applies by default to the at least one child element.

5. The method of claim 4, further comprising defining at least one group consisting of user interface elements of the scene sharing a single security policy.

6. The method of claim 5, wherein the modification action includes at least one of:
modification of the user interface element in the scene;
deletion of the user interface element from the scene;
modification of the security policy in the scene.

7. The method of claim 6, wherein the at least one securement rule includes at least one item of information including at least one of:
a restriction of applying the modification action to the user interface element of the scene;
a restriction of applying a modification to a group of user interface elements of the scene;
a restriction of applying a modification to all user interface elements of the scene of a predefined type;
a restriction of applying a modification based on at least one predetermined criterion;
a restriction of executing a command in a given context of the scene.

8. The method of claim 7, wherein the different portions of identification information each include at least one of:
an identifier;
an IP address; and
a certificate used to sign content transmitted by the source.

9. The method of claim 1, wherein the identification information is provided by a means of access to the update.

10. The method of claim 1, wherein the identification information is at least one of present in the update request, and transmitted with the update request.

11. The method of claim 1, wherein the at least one securement rule defines the at least one authorization for modifying the user interface element of the scene, and a location of the scene where the modification is authorized.

* * * * *

UNITED STATES PATENT AND TRADEMARK OFFICE
CERTIFICATE OF CORRECTION

PATENT NO. : 8,533,816 B2  
APPLICATION NO. : 12/989650  
DATED : September 10, 2013  
INVENTOR(S) : Elouan Le Coq et al.

Page 1 of 1

It is certified that error appears in the above-identified patent and that said Letters Patent is hereby corrected as shown below:

Title page
Item (75) Inventors; please replace "Pierre Gouesbet" with --Pierre-Erwann Gouesbet--.

Signed and Sealed this
Eighth Day of March, 2016

Michelle K. Lee
*Director of the United States Patent and Trademark Office*